United States Patent

Harbin

[11] Patent Number: 5,887,676
[45] Date of Patent: Mar. 30, 1999

[54] ACCESSORY FOR ALLOWING USE OF A TREE STAND AS A GAME CARRIER

[76] Inventor: Daniel H. Harbin, 128 Appletree Dr., Clinton, Tenn. 37716

[21] Appl. No.: 924,888

[22] Filed: Sep. 5, 1997

Related U.S. Application Data

[60] Provisional application No. 60/026,044, Sep. 13, 1996.

[51] Int. Cl.$^6$ .................................................. A47F 3/26
[52] U.S. Cl. ........................... 182/20; 182/187; 182/127
[58] Field of Search ........................... 182/20, 116, 187, 182/127

[56] References Cited

U.S. PATENT DOCUMENTS

| | | |
|---|---|---|
| 2,843,393 | 7/1958 | Dahlander . |
| 3,352,379 | 11/1967 | Riggs . |
| 4,321,982 | 3/1982 | Strickland . |
| 4,582,165 | 4/1986 | Latini ........................................ 182/20 |
| 4,934,485 | 6/1990 | Purkapile ................................... 182/20 |
| 5,433,291 | 7/1995 | Shoestock, Sr. . |
| 5,482,137 | 1/1996 | McNeill . |
| 5,492,196 | 2/1996 | Michno . |

FOREIGN PATENT DOCUMENTS

| | | | |
|---|---|---|---|
| 1344461 | 10/1963 | France ....................................... 182/20 |
| 430985 | 8/1967 | Switzerland ............................ 182/127 |
| 1012669 | 12/1965 | United Kingdom ..................... 182/20 |
| WO 93/00967 | 1/1993 | WIPO . |

*Primary Examiner*—Alvin Chin-Shue
*Attorney, Agent, or Firm*—Richard C. Litman

[57] ABSTRACT

An accessory kit which allows the tree stand to be used as a game carrier without interfering with the normal functioning of the tree stand. The kit includes a pair of support members that are pivotally mounted to the tree stand frame. Each support member rotatably supports a wheel at its free-swinging end, thus allowing the wheel to move between retracted and deployed positions. A pair of locking braces extend between the tree stand frame and each support member to fix the wheels in the deployed position. The wheels are retracted by detaching one end of each locking brace from the respective support member and then folding the locking braces. The support members are folded over the locking braces. The support members can be releasably pinned to the brackets supporting the locking braces to fix the wheels in the retracted position. A pair of handle bars can be attached to the hinged ends of the support members to use the tree stand as a game carrier.

5 Claims, 6 Drawing Sheets

ACCESSORY FOR ALLOWING USE OF A TREE STAND AS A GAME CARRIER

CROSS-REFERENCE TO RELATED APPLICATIONS

This application claim the benefit of U.S. Provisional Application Ser. No. 60/026,044 filed Sep. 13, 1996.

BACKGROUND OF THE INVENTION

1. Field of the Invention

The present invention relates to an accessory which allows a tree stand to be used as a game carrier without affecting normal operation of the tree stand.

2. Description of Related Art

In heavily hunted woodland areas, hunting from tree stands is becoming one of the most productive and popular hunting methods. Tree stands usually fold into a more compact package allowing the tree stand to be carried on the hunter's back in the manner of a backpack. When the hunter travels to and from a hunting site, the hunter has to carry a considerable amount of equipment including a firearm or bow, ammunition or arrows, the tree stand, a flashlight, a survival kit, provisions, and game calls. Because the tree stand is carried on the back, the hunter is precluded from wearing a backpack and thus often times he or she will have both hands full with equipment when trekking to the hunting site.

Another piece of equipment that hunters often find useful is the game carrier, which is used to transport harvested game out of the hunting fields. This device somewhat resembles a wheelbarrow, having a frame which is supported on an axle or a single wheel.

Therefore, if the hunter plans to use a game carrier to haul his game out of the hunting area, he or she must usually make two trips, a first trip to carry the tree stand and other equipment to the hunting site and a second trip to carry the game carrier to the hunting site.

For the above reasons, combination tree stand/game carriers have been proposed in the related art. However, hunters who have already invested in a tree stand would prefer not to incur the substantial expense of a new combination tree stand/game carrier. Further, hunters who have become comfortable with the use and operation of their old tree stands would rather not give up their old tree stands. Therefore, it would be desirable to have an accessory kit that can be used to retrofit an existing tree stand for conversion of the existing tree stand into a combination tree stand/game carrier. The present invention provides exactly such an accessory kit which can be used to retrofit an existing tree stand for conversion of the existing tree stand into a combination tree stand/game carrier.

U.S. Pat. No. 3,352,379, issued to Harley B. Riggs on Nov. 14, 1967, shows a combination tree stand and game cart. Riggs does not show an accessory kit that can be retrofitted to an existing, conventional tree stand.

U.S. Pat. No. 4,321,982, issued to Robert E. Strickland on Mar. 30, 1982, shows a combination tree stand and game cart. Strickland does not show an accessory kit that can be retrofitted to an existing, conventional tree stand.

U.S. Pat. No. 5,433,291, issued to Richard F. Shoestock, Sr. Jul. 18, 1995, shows a combination tree stand and wheeled game carrier. Shoestock does not show an accessory kit that can be retrofitted to an existing, conventional tree stand.

U.S. Pat. No. 5,482,137, issued to Thomas L. McNeill on Jan. 9, 1996, shows a combination tree stand and game carrier. McNeill does not show an accessory kit that can be retrofitted to an existing, conventional tree stand. Further, McNeill does not show the retractable wheel supporting members of the present invention.

U.S. Pat. No. 5,492,196, issued to John L. Michno on Feb. 20, 1996, shows a combination tree stand and game cart. Michno does not show an accessory kit that can be retrofitted to an existing, conventional tree stand.

International (PCT) Patent Application Number WO 93/00967, by Joseph Skovajsa, published Jan. 21, 1993, shows a wheeled tree climbing device. Skovajsa does not show an accessory kit that can be retrofitted to an existing, conventional tree stand.

None of the above inventions and patents, taken either singly or in combination, is seen to describe the instant invention as claimed.

SUMMARY OF THE INVENTION

The present invention is directed to an accessory kit for use with a tree stand. The accessory kit can be retrofitted onto an existing tree stand and allows the tree stand to be used as a game carrier without interfering with normal functioning of the tree stand. The kit includes two brackets that are mounted to the tree stand frame. Each of the brackets pivotally supports a support member at one end. Each support member rotatably supports a wheel at its free-swinging end, thus allowing the wheel to move between retracted and deployed positions. A pair of locking braces extend between the tree stand frame and each support member to fix the wheels in the deployed position. A second pair of brackets hingedly support the respective ends of the locking braces attached to the tree stand frame. The wheels are retracted by detaching one end of each locking brace from the respective support member and then folding the locking braces. The support members are folded over the locking braces. The support members can be releasably pinned to the brackets supporting the locking braces to fix the wheels in the retracted position. A pair of handle bars can be attached to the hinged ends of the support members to use the tree stand as a game carrier. By virtue of the retractable wheel supporting members, the kit of the present invention provides significantly greater ground clearance in the game carrier configuration than the combination tree stand/game carriers of the prior art. The greater ground clearance is particularly advantageous when transporting game over rough terrain, or through thick and/or tall grass and brush.

Accordingly, it is a principal object of the invention to provide an accessory kit that allows a tree stand to be converted into a game carrier.

It is another object of the invention to provide an accessory kit for converting a tree stand into a game carrier, which accessory kit can be retrofitted to an existing tree stand.

It is a further object of the invention to provide an accessory kit for converting a tree stand into a game carrier, which accessory kit will not interfere with the normal operation of the tree stand.

Still another object of the invention is to provide an accessory kit for converting a tree stand into a game carrier, which accessory kit will provide a greater ground clearance than prior art devices when, in combination with a tree stand, the accessory kit is configured as a game carrier.

Yet another object of the invention is to provide an accessory kit for converting a tree stand into a game carrier, which accessory kit can, after being mounted to a tree stand, be transformed between a retracted configuration and a deployed configuration without the use of tools.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
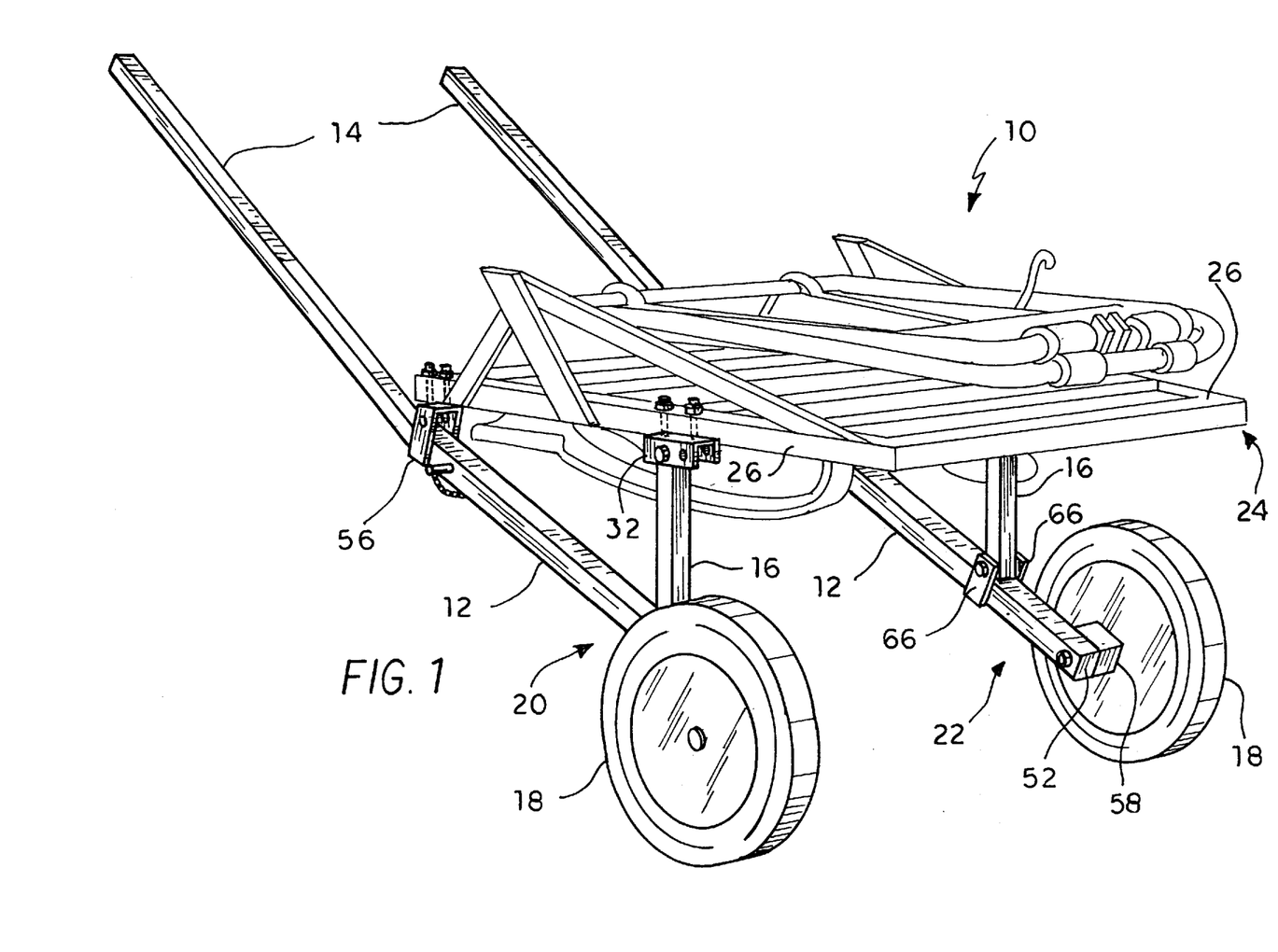
FIG. 1 is an environmental perspective view showing the accessory kit of the present invention attached to a tree stand and shown in the deployed condition for carrying game.
Figure 5:
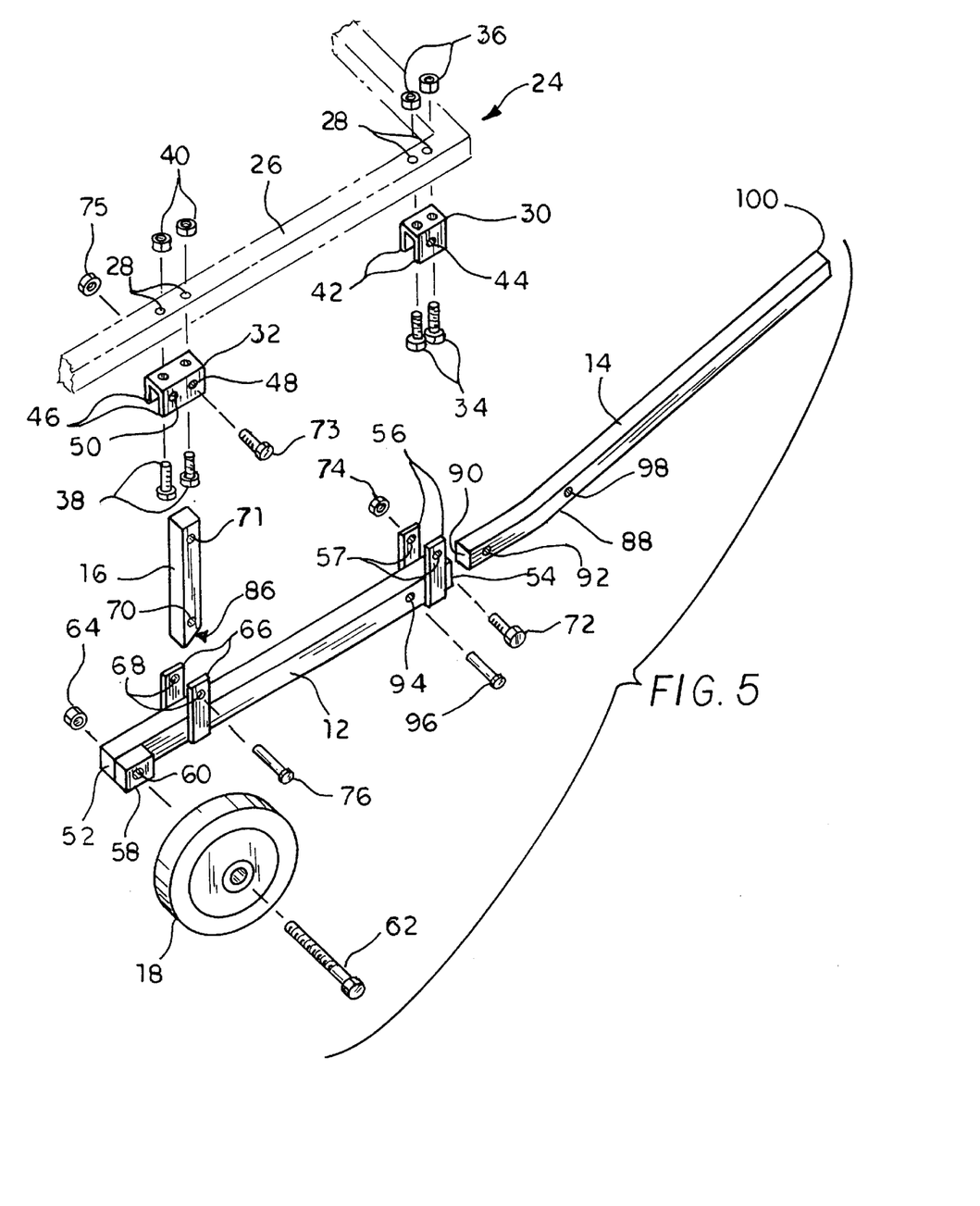
FIG. 5 is an exploded view of the right subassembly of the accessory of the present invention, the left subassembly being a mirror image thereof.

Referring to FIGS. 1 and 5, the present invention is an accessory for use with a tree stand 10 including a pair of folding support members 12, a pair of handles 14, a pair locking braces 16, a pair of wheels 18, and an assortment of hardware. The assortment of hardware is used for assembling the other parts enumerated above to form a left subassembly 20 and a right subassembly 22, and for attaching the subassemblies 20 and 22 to the frame 24 of the tree stand 10. The two subassemblies 20 and 22 are mirror images of one another. Therefore only the right subassembly 22 is illustrated in FIG. 5.

Tree stands generally have at least two parallel frame members 26 which, when the tree stand is in the collapsed state and laid horizontally, define a substantially flat base without any significant obstructions on its underside. Each of the subassemblies 20 and 22 is attached to a respective frame member 26 in the manner illustrated in FIG. 5. As was stated previously, FIG. 5 shows only an exploded view of the right subassembly 22; an exploded view of the left subassembly 20 having been omitted because the left subassembly 20 is merely a mirror image of the right subassembly 22.

Referring to FIG. 5, the tree stand 10 is first prepared by drilling four holes 28 in each of the frame members 26 (only one frame member shown). This is the only modification that needs to be made to the tree stand 10. A bracket 30 is fastened to the frame member 26 using bolts 34 and nuts 36. A second bracket 32 is fastened to the frame member 26 using bolts 38 and nuts 40.

Figure 6:
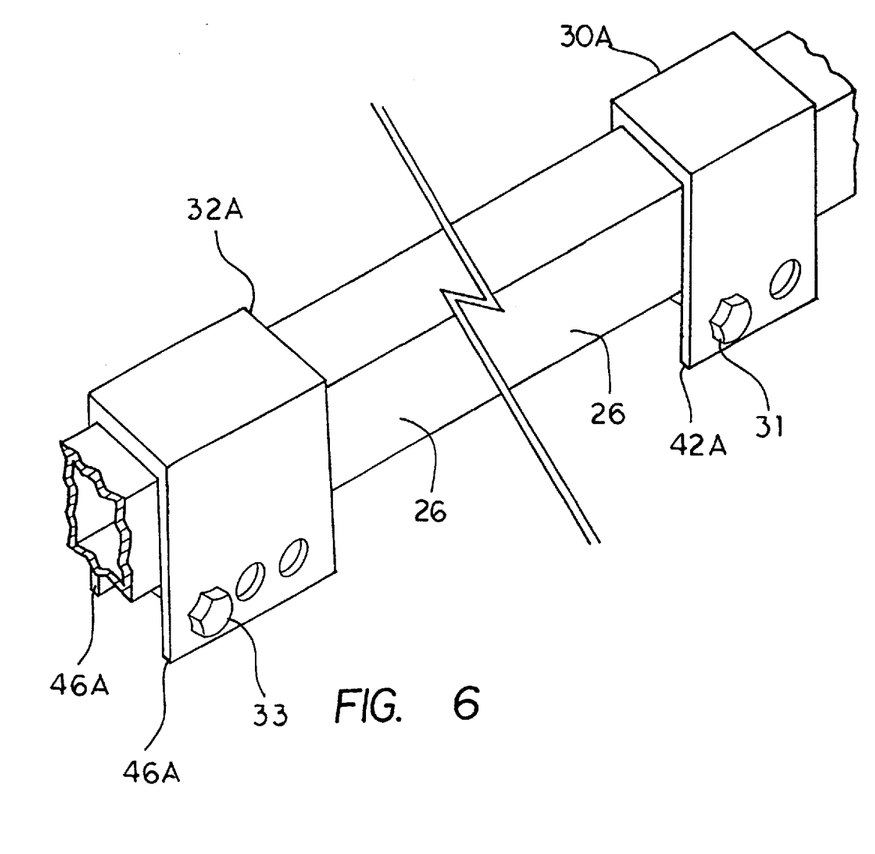
FIG. 6 is a fragmentary view showing an alternative type of mounting bracket for use with the present invention.

Note that other methods of attaching brackets 30 and 32 to frame members 26 may also be used, which require no modification of the tree stand 10. For example, slightly modified versions of the brackets 30 and 32 may be clamped to the frame members 26. As shown in FIG. 6, the walls 42a and 46a of the brackets 30a and 32a are made longer than the walls 42 and 46 of the brackets 30 and 32. Thus, the brackets 30a and 32a can fit around the frame member 26. Also, each of the brackets 30a and 32a have an additional bolt hole as compared to brackets 30 and 32. The additional bolt holes allow the bolts 31 and 33 and the associated nuts (not shown) to be used to squeeze the frame member 26 between the walls of the brackets 30a and 32a, thus clamping the brackets 30a and 32a to the frame member 26. Therefore, the arrangement shown in FIG. 6 obviates the need for drilling the frame member 26.

Each wall 42 of the first bracket 30, projecting perpendicularly relative to the frame member 26, has a hole 44 (only one shown). The holes 44 are in registry with one another. Each wall 46 of the second bracket 32, projecting perpendicularly relative to the frame member 26, has two holes 48 and 50 (only one of each shown). Each of the holes 48 and 50 in one of the walls 46 registers with the similar holes in the other wall 46.

Each support member 12 has a first end 52 and a second end 54. A pair of plates 56 are fixed to either side of the support member 12 proximate the second end 54. Each plate 56 has a hole 57 that registers with the hole 57 in the other plate 56. A spacer 58 is fixed to one side of each support member 12 near the first end 52. In the case of the left subassembly 20 the spacer 58 is fixed to the left side of the support member 12, while in the case of the right subassembly 22 the spacer 58 is fixed to the right side of the support member 12. A through-hole 60 is bored through the spacer 58 and through the first end 52 of the support member 12. The through-hole 60 allows the wheel 18 to be rotatably mounted to the first end 52 of the support member 12 by the wheel bolt 62 and nut 64.

Intermediate the first end 52 and the second end 54, but closer to the first end 52, a second pair of plates 66 are fixed to either side of the support member 12. Each plate 66 has a hole 68 that registers with the hole 68 in the other plate 66. A locking brace 16 is pivotally secured at one end to the holes 48 of the bracket 32. The locking brace 16 has a hole 71 at one end thereof which allows the locking brace 16 to be pivotally secured to the holes 48 of the bracket 32 using the bolt 73 and the nut 75. The other end of the locking brace 16 is beveled and has a hole 70 therethrough. The locking brace 16 is narrow enough to fit between the walls 46 of the bracket 32 and between the plates 66.

With the wheel 18 rotatably mounted to the first end 52 of the support member 12, the accessory is mounted to the tree stand 10 by positioning the support member 12 under the frame member 26 such that the plates 56 are positioned below the bracket 30 and the plates 66 are positioned below the bracket 32. The second end 54 of the support member 12 is then pivotally secured to the frame member 26 by positioning the plates 56 around the bracket 30 such that the holes 57 are aligned with holes 44, and securing the plates 56 to the bracket 30 using bolt 72 and the nut 74. The connection to the bracket 30 allows the support member 12 to pivot between a deployed position and a retracted position.

The support member 12 is secured in the deployed position by placing the bevelled end of the locking brace 16 between the plates 66 such that the hole 70 is placed in alignment with the holes 68. The bevelled end of the locking brace 16 is then secured to the plates 66 by inserting the shaft 78 (see FIGS. 7A and 7B) of the pin 76 through the holes 68 and 70. The pin 76 is removable and may be secured in place in any well known manner.

Figure 7A:
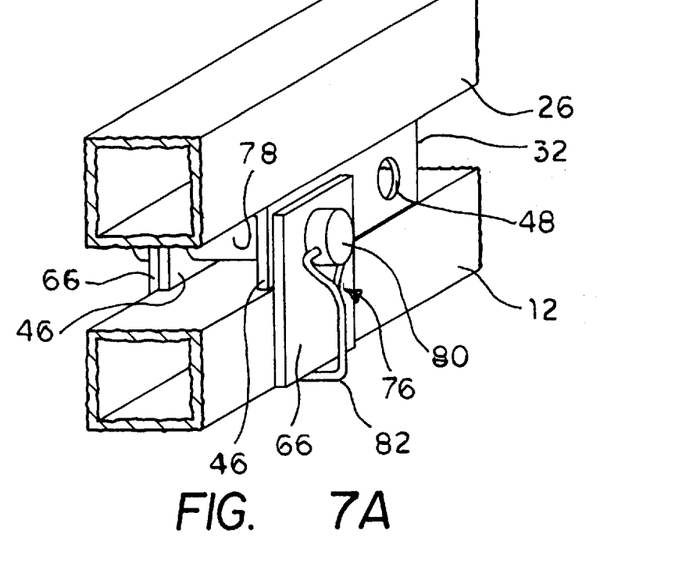
FIG. 7A is a fragmentary view showing details of the head of a removable pin usable with the present invention.
Figure 7B:
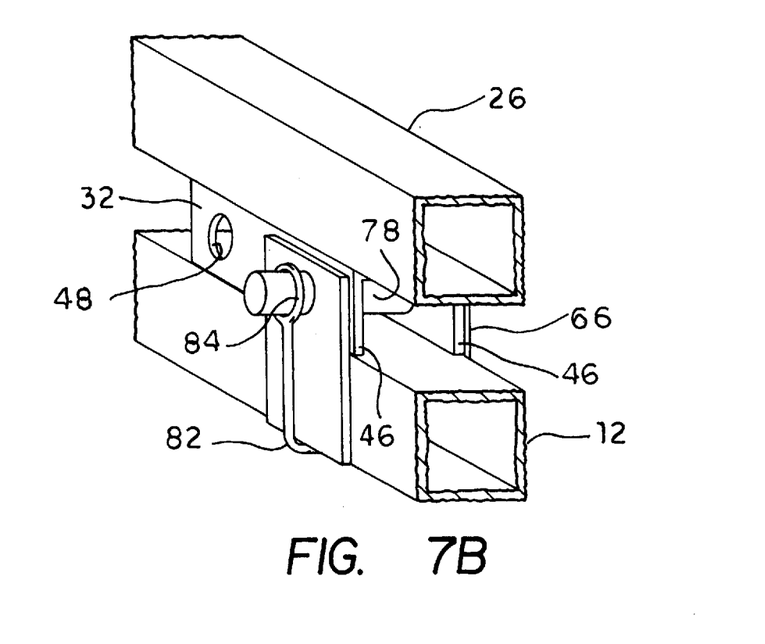
FIG. 7B is a fragmentary view showing details of the attachment of a U-shaped retaining spring to the shaft of a removable pin usable with the present invention.

An example of a removably securable pin 76 is shown in FIGS. 7A and 7B. Pin 76 has a shaft 78. A head 80 is attached to one end of the shaft 78. The head 80 is larger in diameter than the shaft 78. The pin 76 also includes a U-shaped retaining spring 82. One end of the U-shaped spring 82 is hingedly attached to the head 80. The other end of the U-shaped spring 82 terminates in an eye 84 that can fit around the shaft 78. The distance between the ends of the U-shaped spring 82 is less than the length of the shaft 78. The U-shaped spring is fairly rigid but has sufficient resilience to allow the eye 84 to snap over the end of the shaft 78 distal from the head 80. Thus, for example, after the shaft 78 is inserted through the holes 68, the eye 84 is slipped over the end of the shaft 78 distal from the head 80 to secure the pin 76 in place. Note that the locking brace 16 has been omitted from FIGS. 7A and 7B in the interest of clarity.

The relief cut 86 forming the bevelled end of the locking brace 16 is necessary to accommodate the support member 12 when the support member is secured in the deployed position, because the support member will be at an acute angle relative to the locking brace 16. Otherwise the edge of a square ended locking brace would interfere with the alignment of hole 70 with the holes 68 in the plates 66.

The support member 12 is made of hollow, square cross-sectional tubing. The accessory kit of the present invention also includes the handle bars 14. The handle bars 14 are also of square cross section tubing and have a slight kink 88 near the first end 90 thereof. The tubing of the handle bars 14 is dimensioned to fit inside the support members 12. Also near the first end 90 is a through-hole 92. The hole 92 registers with a hole 94 in the support member 12. In the deployed condition the first end 90 of each handle bar 14 is inserted into the respective support member 12 until hole 92 is in registry with the hole 94. The handle bar 14 is then secured in the deployed condition by passing a removable pin 96 through both the hole 92 and the hole 94. The pin 96 is of the same type as the pin 76. The tree stand 10 in combination with subassemblies 20 and 22 in the deployed condition will resemble a wheel barrow and is illustrated in FIG. 1. With the accessory in the deployed condition, a game animal can be placed on the collapsed tree stand 10 and carried out of the hunting area to a vehicle or base camp.

Near the kink 88, but toward the second end 100 of the handle 14 is a hole 98. The handle bar 14 can be removed from the support member 12 by removing the pin 96 and pulling the first end 90 of the handle bar 14 out of the support member 12. The handle bar 14 can then be stored in the support member 12 by inserting the second end 100 of the handle bar 14 into the support member 12 and slidingly moving the handle bar 14 into the support member 12 until the hole 98 is in alignment with the hole 94. The pin 96 can now be used to secure the handle bar 14 in the stowed position.

Figure 2:
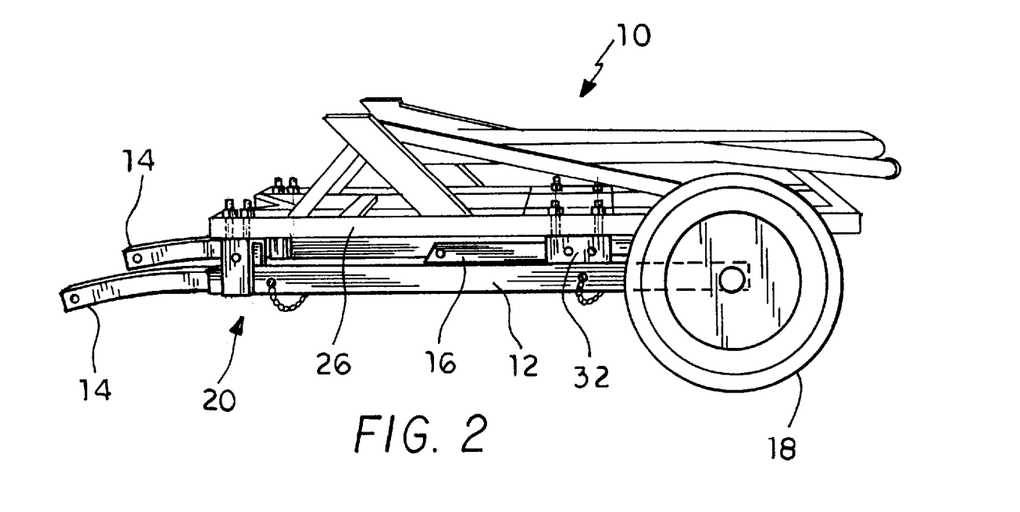
FIG. 2 is an environmental perspective view showing the accessory kit of the present invention attached to a tree stand and shown in the retracted condition for transportation.
Figure 3:
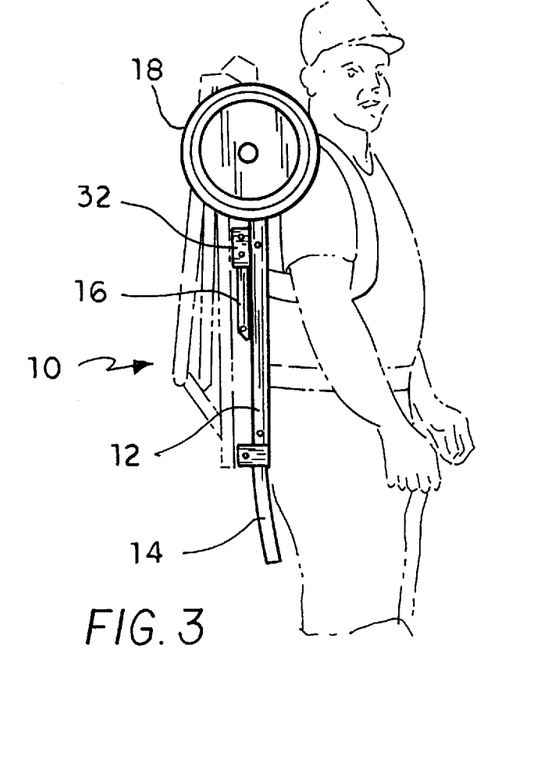
FIG. 3 is an environmental perspective view showing the accessory of the present invention attached to a tree stand with the tree stand being carried on a user's back in the manner of a backpack.
Figure 4:
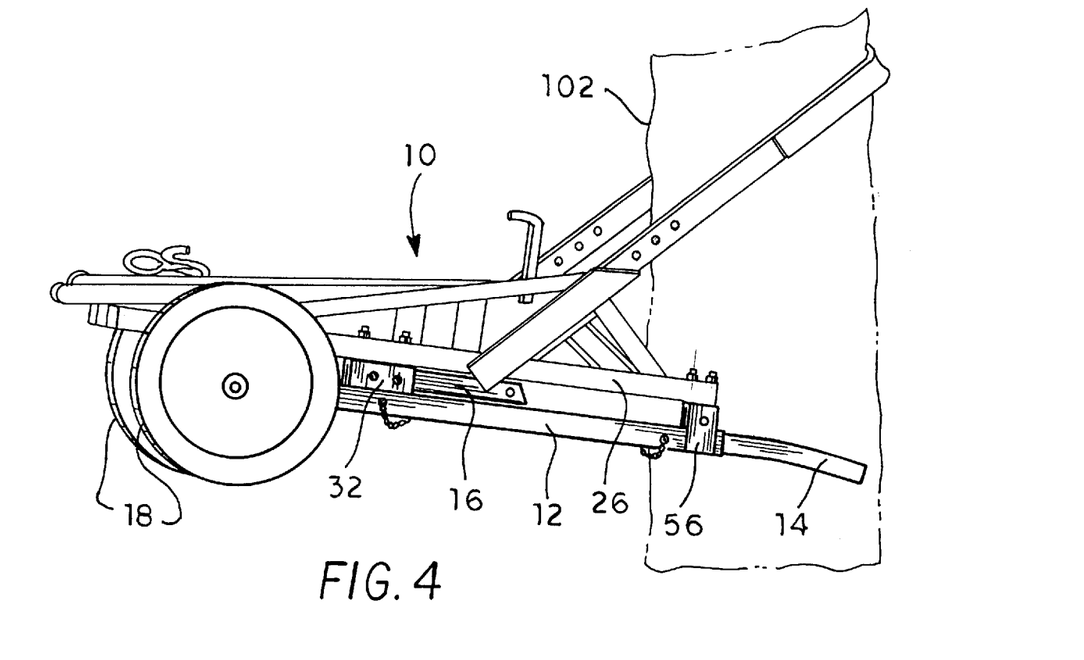
FIG. 4 is an environmental perspective view showing the accessory of the present invention attached to a tree stand with the tree stand mounted to a tree trunk.

With the handle bars 14 stowed in the respective supporting members 12, the supporting members 12 are moved to the retracted position to place the accessory in the fully packed or fully collapsed condition shown in FIG. 2. To move the support members 12 to the retracted position, the pins 76 are removed and the locking braces 16 are folded against the respective frame members 26 with their bevelled ends pointing toward the second end 54 of the respective support members 12. The support members 12 are then folded into the retracted position by bringing the first end 52 of the support members 12 toward the respective frame members 26. Once the support members 12 are in the retracted position the holes 68 in the plates 66 will be aligned with the holes 50 in the walls 46 of the brackets 32. The pins 76 can then be used to secure the support members 12 in the retracted position when the pins 76 are placed through the holes 68 and 50. FIG. 2 illustrates the fully collapsed tree stand 10 with the fully collapsed accessory of the present invention attached thereto. As illustrated in FIG. 3, the collapsed accessory of the present invention in no way interferes with the carrying of the tree stand 10 on ones back in the manner of a backpack. FIG. 4 shows the tree stand 10, with the subassemblies 20 and 22 attached, being mounted to a tree trunk 102 in the normal manner. As can be seen in FIG. 4, the collapsed subassemblies 20 and 22 in no way interfere with the function of the tree stand 10 as a platform atop which a hunter can wait in ambush for game animals.

The preferred material for fabrication of the tree stand accessory of the present invention is aircraft grade aluminum, however any suitable metal, plastic, or composite material, including carbon fiber composites, may also be used in the fabrication of the present invention. Also, the kink 88 in the handle bars 14 is not essential and the handle bars 14 may be made perfectly straight. Further, rather than telescoping into the support members 12, the handle bars 14 may fold or be made collapsible in any known manner. In addition, each handle bar 14 may have a folding or detachable leg attached thereto, which would keep the handle bars 14 relatively level when the handle bars 14 are rested on the ground. Thus the legs would prevent a game animal from rolling down the handle bars 14 which would otherwise be inclined relative to the ground when rested on the ground.

It also should be noted that the bracket 32 could be formed as two distinct brackets, each having opposed walls with a single hole passing therethrough. With two separate brackets, one would be used to pivotally attach a locking brace to the tree stand frame and the other would be used to secure the support member in a retracted position. Assuming two separate brackets were used in place of each bracket 32, then it may be necessary to use two distinct pairs of plates secured to the support member. One pair of plates would be used to attach the locking brace to the support member when the support member is in the deployed position, whereas the other pair of plates would be used to attach the support member to the tree stand frame when the support member is in the retracted position.

It is also contemplated that only one subassembly may be required to render the retrofitted tree stand suitable for use as a game carrier. In such a situation, the subassembly may be appropriately positioned with respect to the tree stand frame so as to ensure proper balance. Where only one subassembly is used, it is desirable to provide a bifurcated handlebar which will allow a user to balance the device while carrying game.

It is to be understood that the present invention is not limited to the embodiments described above, but encompasses any and all embodiments within the scope of the following claims.

I claim:

1. An accessory kit for use with a tree stand, the tree stand having a frame member, said accessory kit comprising:

a first support member having a first end and a second end;

a second support member having a first end and a second end;

a first wheel rotatably supported at said first end of said first support member;

a second wheel rotatable supported at said first end of said second support member;

first attachment means for pivotally attaching said second end of each said support member to the frame member, said first attachment means allowing each said support member to pivot between a deployed position and a retracted position;

a first locking brace having a first end and a second end;

a second locking brace having a first end and a second end;

second attachment means for pivotally attaching said first end of each said locking brace to the frame member;

third attachment means for releasably attaching each said support member, at a location intermediate said first and second ends thereof, to said second end of each said locking brace while each said support member is in said deployed position;

first securing means for securing each said support member in said retracted position;

a first handlebar releasably attached to said second end of said first support member; and a second handlebar releasably attached to said second end of said second support member, wherein each said locking brace includes a through-hole formed as said first end thereof; and said second attaching means comprises a second bracket adapted to be connected to the frame member, said second bracket having opposed walls each of said opposed walls having a hole, said hole of one of said wall being in registry with the hole of the other of said wall, and a second bolt passing said hole of said opposed walls and said through-hole of each said locking brace when each said locking brace is positioned with respect with said second bracket such that said through-hole thereof aligns in registry with said hole of each said wall, wherein each said locking brace includes as second through-hole formed at said second end thereof; and said third attaching means comprising a second pair of plates secured to opposed sides of each said support member intermediate said first and second ends thereof, each of said second pair of plates having a hole, and said second pair of plates being secured to each said support member such that said hole of one said plate is in registry with the hole of the other said plate, and a pin, said pin passing through said holes of said second pair of plates and said second through-hole of each said locking brace when each said locking brace is positioned with respect to said second pair of plates such that said through-hole thereof aligns in registry with said hole of each said second pair of plates while each said support member is in said deployed position; wherein said first securing means comprises said second bracket, said second bracket having a second hole in each of said opposed walls, said second hole of one said wall being in registry with the second hole of the other of said walls; said second pair of plates; and said pin, said pin passing through said second hole of said opposed walls and said holes of said second pair of plates when said second pair of plates is positioned with respect to said second bracket such that said holes thereof aligns in registry with said second holes of each said walls while each said support member is in said retracted position.

2. The accessory kit according to claim 1, wherein each said support member is hollow, and each said handlebar can be stored substantially in each said support member when each said handlebar is not being used.

3. The accessory kit according to claim 1, wherein said first attachment means comprises:

a first bracket adapted to be connected to the frame member, said first bracket having opposed walls, each of said opposed walls having a hole, said hole of one said wall being in registry with the hole of the other of said wall;

a pair of plates secured to opposite sides of each said support member at said second end thereof, each of said pair of plates having a hole, and said pair of plates being secured to each said support member such that said hole of one said plate is in registry with the hole of the other said plate; and a bolt passing through said holes of said pair of plates and said opposed walls when said pair of plates are positioned with respect to said first bracket such that said hole of each said pair of plates aligns in registry with said hole of each said wall.

4. The accessory kit according to claim 1, wherein said third attachment means further comprises second securing means for removably securing said pin with respect to said second pair of plates and each said locking brace.

5. The accessory kit according to claim 1, wherein said second end of each said locking brace is beveled.

* * * * *